Dec. 30, 1958 S. M. SHERMAN 2,866,332
COMPENSATION MEANS FOR MEASURING DEVICES
Filed March 10, 1954 4 Sheets-Sheet 1

Inventor
Samuel M Sherman
By
Synnestvedt & Lechner
Attorneys

Dec. 30, 1958  S. M. SHERMAN  2,866,332
COMPENSATION MEANS FOR MEASURING DEVICES
Filed March 10, 1954  4 Sheets-Sheet 2
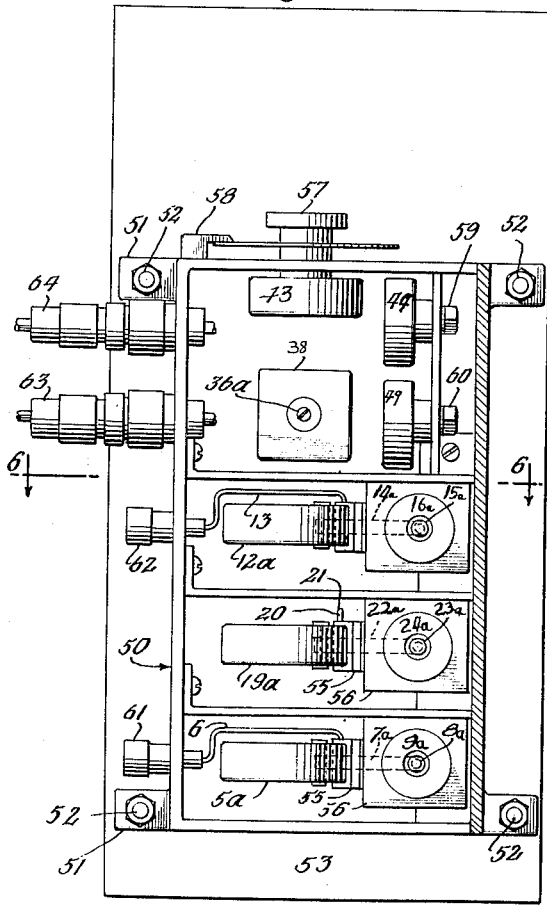
Fig. 5.
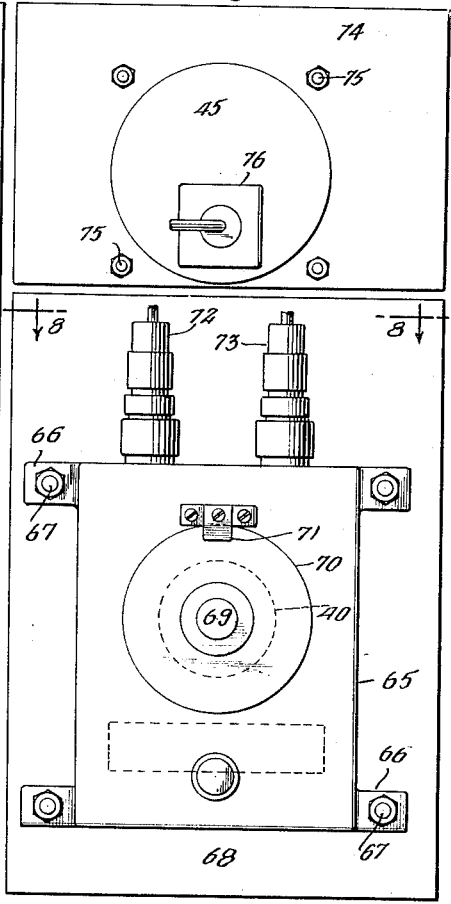
Fig. 9.
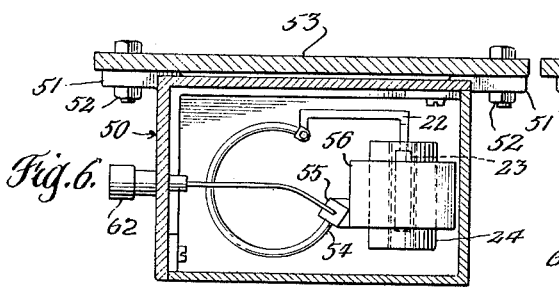
Fig. 6.
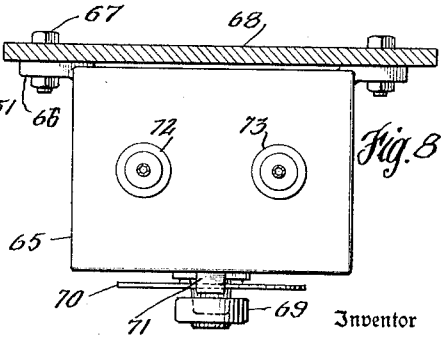
Fig. 7.
Fig. 8.
Inventor
Samuel M Sherman
Synnestvedt & Lechner
Attorneys Dec. 30, 1958 S. M. SHERMAN 2,866,332
COMPENSATION MEANS FOR MEASURING DEVICES
Filed March 10, 1954 4 Sheets-Sheet 3
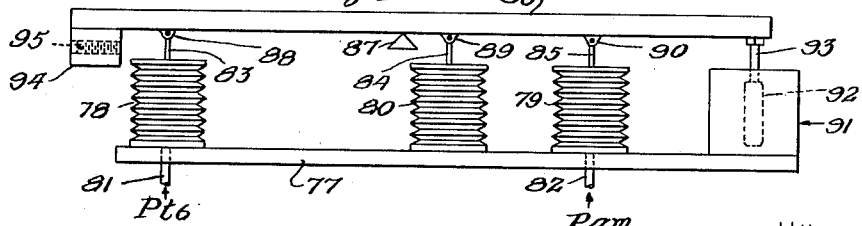
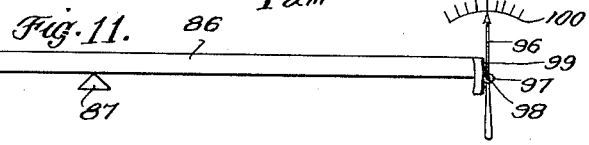
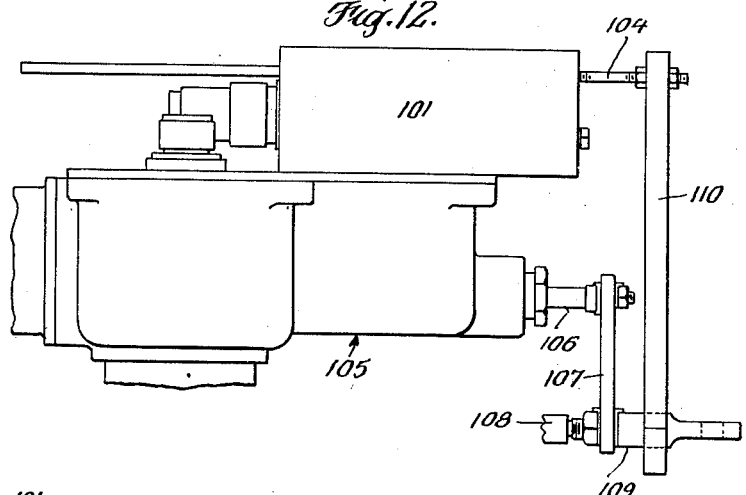
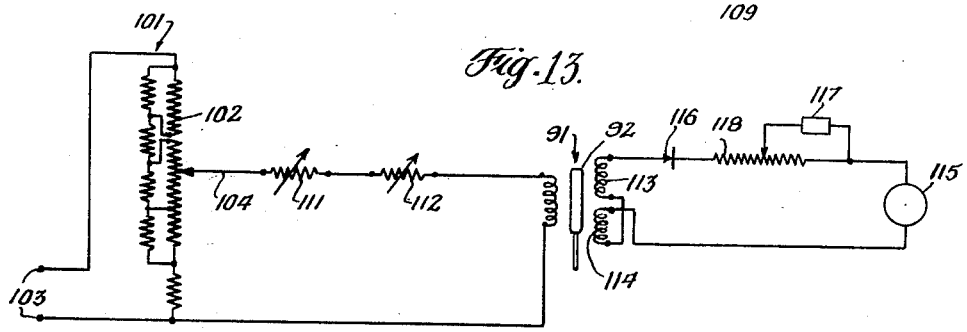
Inventor
Samuel M. Sherman
By
Synnestvedt & Lechner
Attorneys Dec. 30, 1958   S. M. SHERMAN   2,866,332
COMPENSATION MEANS FOR MEASURING DEVICES
Filed March 10, 1954   4 Sheets-Sheet 4
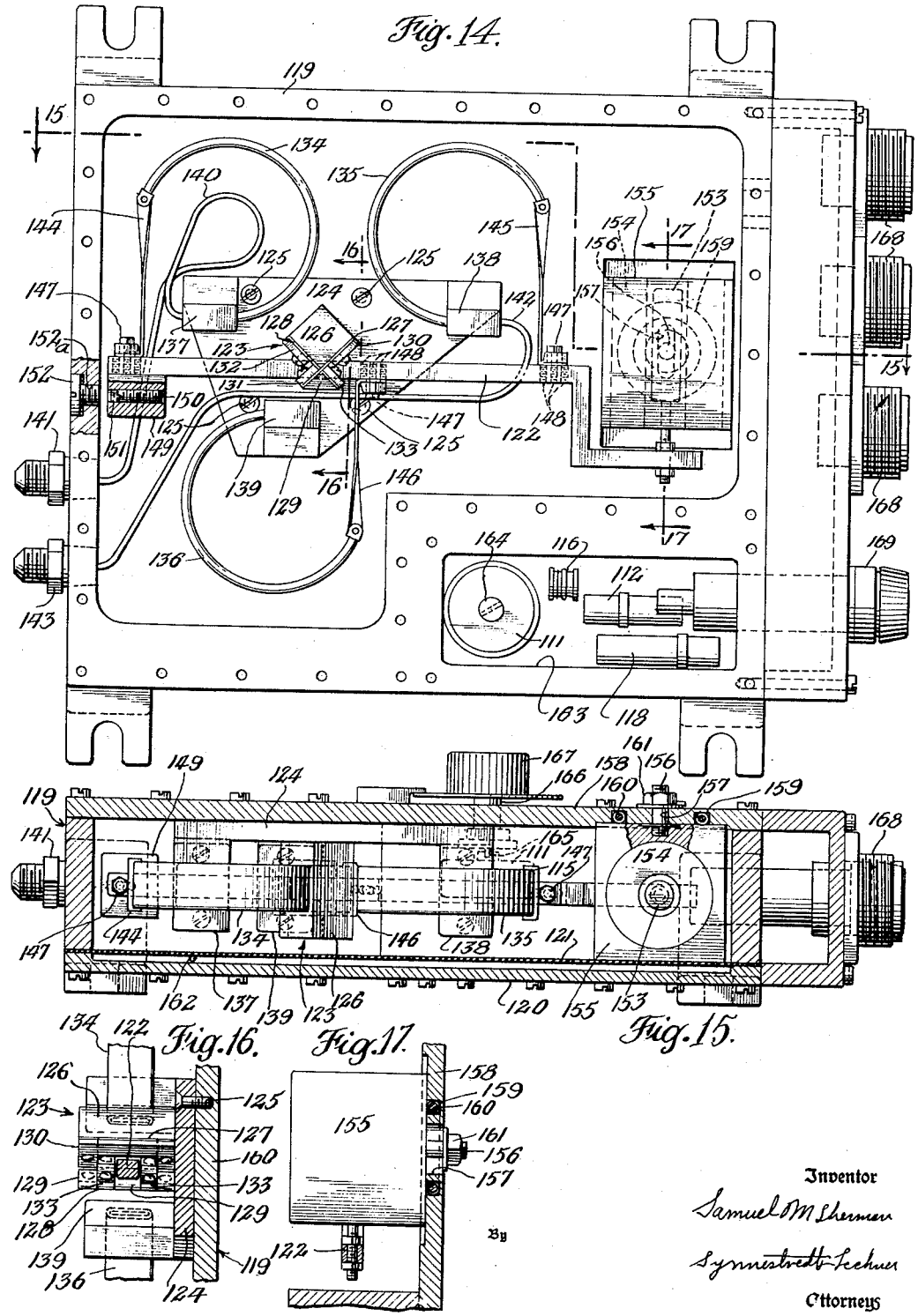
Inventor
Samuel M Sherman
Synnestvedt Lechner
Attorneys

United States Patent Office 2,866,332
Patented Dec. 30, 1958

2,866,332

COMPENSATION MEANS FOR MEASURING DEVICES

Samuel M. Sherman, Philadelphia, Pa., assignor to Schaevitz Engineering, Pennsauken, N. J., a corporation of New Jersey Application March 10, 1954, Serial No. 415,301

22 Claims. (Cl. 73—116)

This invention relates generally to apparatus for simultaneously measuring a plurality of variable physical conditions or forces and for producing a single output signal whose value is mathematically related to the instantaneous values of the measurements so obtained.

More particularly, one aspect of the invention is concerned with apparatus of the kind generally described above, which in normal use is subjected to one or more additional variable conditions to which portions of the apparatus are sensitive, but whose output is nevertheless determined only by the instantaneous values of the forces or conditions whose measurement is required.

A known form of such apparatus is intended to produce a final output signal whose value is proportional to $F$, where $$F = Q(a_1 P_1 + \ldots a_n P_n) \quad (1)$$

wherein $P_1, \ldots P_n$ are $n$ variables representing $n$ forces or conditions, $Q$ is a factor of proportionality, and $a_1, \ldots a_n$ are respectively the co-efficients of $P_1, \ldots P_n$.

$F$ may be, for example, the thrust produced by a jet engine; $P_1, \ldots P_n$ may be $n$ different gas pressures from whose values the thrust of the engine may be computed; $Q$ may represent another physical factor relating to the operation of a gas turbine; and $a_1, \ldots a_n$ may be the co-efficients of an equation for determining the thrust of a jet engine when $P_1, \ldots P_n$ and $Q$ are known.

In such apparatus $P_1, \ldots P_n$ are expressed as signals produced by $n$ force sensitive devices, which signals are afforded combining weights proportional to their respective co-efficients, and combined to produce an output signal.

Ideally, each force sensitive device produces a signal output whose amplitude is determined solely by the magnitude of the force or condition which that device is intended to measure; but any practical device which is otherwise suitable for such use is also responsive to one or more spurious forces or conditions, such as acceleration or local atmospheric pressure, and so produces an output signal whose amplitude is proportional to the algebraic sum of the force to be measured and such spurious force or forces.

When the output signal of such a device, with its desired and undesired components, is fed to the computing means along with the similar signal outputs of the other force sensitive devices, the combined output signal will contain desired terms corresponding to the weighted outputs of the several force sensitive devices in their response to the forces to be measured, and an equal number of spurious terms corresponding to the weighted signal outputs of the devices in their response to the spurious force or condition.

Thus, if the apparatus includes $n$ pressure sensitive device $T_1, \ldots T_n$, each respectively responsive to one of the $n$ forces $P_1, \ldots P_n$ which it is desired to measure, and each also responsive to spurious forces whose algebraic sum is $X$, the response of the signal output of the force sensitive device $T_1$ will have a first component proportional to $P_1$ and a second component proportional to $X$, and the output signal of the computer will be:

$$\text{Output} = Q[a_1(P_1 + X) + \ldots a_n(P_n + X)] \quad (2)$$

It has heretofore been proposed to eliminate the unwanted terms from the signal output of such apparatus by providing, in addition to the pressure sensitive devices $T_1, \ldots T_n$, $n$ reference pressure sensitive devices $RT_1, \ldots RT_n$, each sensitive to the spurious force $X$ but insensitive to the forces to be measured $P_1, \ldots P_n$, and arranging matters so that the output of each reference device is fed into the computing means with a combining weight equaling the combining weight afforded the output of one of the primary pressure sensitive devices, but with opposite sign. Thus, for each term in $X$ fed into the computer by one of the primary pressure sensitive devices, a second term in $X$ of equal magnitude but of opposite sign is fed into the computer by the associated reference device, with the result that all the terms in $X$ cancel out and the computer output signal has the desired form. The price paid for this result is the employment of a total of $2n$ force sensitive devices; that is, two force sensitive devices for each variable force which is to be measured.

It is a primary object of the present invention to reduce the number of force sensitive devices as compared with this prior art arrangement.

It is a further object of the invention to reduce the number of force sensitive devices to $n$ plus one, where $n$ is the number of different variable forces which must be measured.

It is another object of the invention to provide apparatus of the kind above discussed and specifically adapted to the computation of the gross thrust produced by an aircraft reaction motor.

It is a further object of the invention to insure that all of the force sensitive devices employed in the apparatus respond identically to spurious forces.

A still further object of the invention is the provision of enormously simplified combining and computing means.

The invention has, as an additional object, the provision of a thrust computing apparatus of the kind described which is capable of operation independently of any source of power other than the forcess to be measured themselves.

How the foregoing and other objects of the invention are attained will be more clearly understood from the detailed description which follows hereinbelow, and from the several figures of the drawings, in which—

Figure 5 is an elevational view of the measuring and computing apparatus of Figure 4;

Figure 6 is a horizontal sectional view of the apparatus illustrated in Figure 5 taken on the line 6—6 of Figure 5;

Figure 7 is an elevational view of the area computing system of the apparatus schematically illustrated in Figure 4;

Figure 8 is a plan section of the structure taken along the line 8—8 of Figure 7;

Figure 9 is an elevational view of the indicating apparatus forming a part of the system of Figure 4;

Figure 10 is a partial illustration of another form of the invention embodying a different kind of pressure sensitive device and employing mechanical means for combining the outputs of the several devices, together with a single means for converting the mechanical output signal to an electrical signal;

Figure 11 is a diagrammatic showing of the application of the mechanical output signal of the structure of Figure 10 to a mechanical indicator;

Figure 12 is an elevational view of a mechanical linkage for interconnecting the aircraft tail area actuator with the area system of a computer constructed in accordance with the invention;

Figure 13 is a schematic diagram of a complete thrust measuring and computing system incorporating the area system of Figure 12 and the pressure system of Figures 14 to 17;

Figure 14 is an elevational view of the pressure system of Figure 13 with the cover removed;

Figure 15 is a plan section of the structure of Figure 14 taken along the line 15—15 of Figure 14;

Figure 16 is a vertical section of a portion of the apparatus of Figure 14 taken along the line 16—16 of Figure 14; and Figure 17 is a vertical section of another portion of the mechanism of Figure 14 taken along the line 17—17 of Figure 14.

The invention is described herein with particular reference to apparatus for computing the gross thrust of a jet reaction engine for aircraft. The specific form of the general equation given above which is employed in the disclosed apparatus to compute thrust is $$F = KA_7(P_{t_6} - C_1 P_{am}) \quad (3)$$

wherein $F$=gross thrust in pounds, $K$ is a scale factor, $A_7$ is the exit area of the engine exhaust nozzle (sometimes referred to as tail area) $P_{t_6}$ is the exhaust nozzle inlet total pressure in absolute units, $P_{am}$ is the ambient atmospheric pressure outside the aircraft in absolute units, and $C_1$ is a function of $k$, where $k$ is the ratio of specific heats of the products of combustion. A representative value for $C_1$ is .80.

Figure 1:
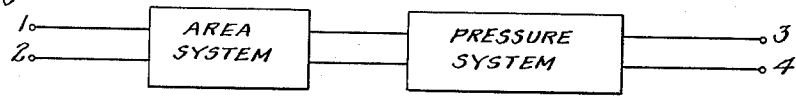
Figure 1 is a block diagram of a measuring and computing apparatus in accordance with the invention.

A block diagram of measuring and computing apparatus for solving this equation is illustrated in Figure 1, in which the input terminals 1 and 2 are connected to a source of electric energy, for example, a source of low voltage 400 cycle alternating current. The box labeled "Area System" contains means for adjusting the amplitude of the input voltage in accordance with the tail area of the engine in question. In some cases, where the tail area is controllable in flight, the "area system" is connected by suitable linkage with the mechanism for varying the tail area. In other cases, where the tail area is fixed, the "area system" may comprise a voltage divider which, when once set, requires no further attention.

The box labeled "Pressure System" contains the pressure sensitive devices, which, in one form of the invention illustrated herein, are pressure-electric transducers of the kind utilizing an exciting voltage, whose amplitude is varied by the transducer in accordance with the pressure being measured; and a circuit for combining the outputs of the several transducers in accordance with Equation 3. The output of the computer is fed to output terminals 3 and 4, which may be connected to a meter or other indicating or controlling instrument.

Figure 2:
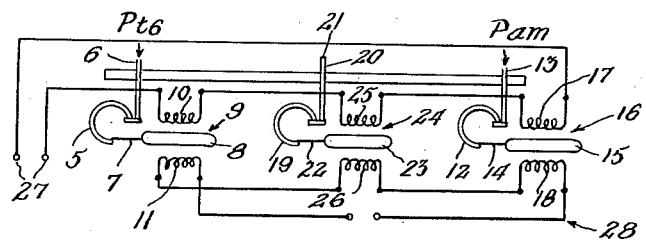
Figure 2 is a schematic diagram of a pressure measuring and computing system according to the invention.

In Figure 2 I have illustrated schematically a simple form of "pressure system" embodying the present invention. A first pressure-electric transducer comprises a bourdon tube 5 which is connected by line 6 to a pressure rake or probe (not illustrated), which extends into the jet engine at the entrance to the exhaust nozzle. The pressure at this station of the engine is known conventionally as $P_{t_6}$.

Bourdon tube 5 is connected by a link 7 to a core 8 of a linear variable transformer (LVT) generally indicated at 9, and having a primary winding 10 and a secondary winding 11. Bourdon tube 5 is so arranged that the displacement of the core 8 varies linearly with the pressure difference between the inside of the tube ($P_{t_6}$) and the outside of the tube, which is exposed to the ambient pressure around the apparatus ($P_a$). LVT 9 is constructed so that with a constant primary current, its secondary voltage varies linearly with respect to displacement of its core. The voltage in secondary winding 11, therefore, varies linearly with variations in $P_{t_6}$ gauge, i. e., the difference between $P_{t_6}$ absolute and $P_a$ absolute.

A second bourdon tube 12 is similarly connected by a line 13 to a T in the altimeter line or other source of outside atmospheric pressure $P_{am}$. Bourdon tube 12 is connected by a link 14 to the core 15 of an LVT generally indicated at 16, and having a primary winding 17 and a secondary winding 18. Except for its connection to a source of $P_{am}$, the pressure sensitive transducer comprising the bourdon tube 12 and LVT 16 is in all respects identical to the $P_{t_6}$ bourdon tube 5 and its LVT 9. It will be understood therefore, that the output voltage appearing across the terminals of secondary winding 18 will vary linearly with $P_{am}$ gauge, that is, the difference between the absolute atmospheric pressure outside the aircraft and $P_a$, the absolute atmospheric pressure inside the aircraft.

A third bourdon tube 19 is evacuated during manufacture through a tube 20, which is then sealed as indicated at 21. Tube 19 is connected by a link 22 to a core 23 of an LVT generally indicated at 24, having a primary winding 25 and a secondary winding 26.

Bourdon tube 19 and its associated LVT 24 are in all respects identical with the other bourdon tubes and LVT's. Since tube 19 is evacuated, the output of LVT 24 is proportional to $P_a$ in absolute terms.

Primary windings 10, 17 and 25 are connected in series in a circuit having input terminals 27 which may conveniently be connected to a source of low voltage alternating current. Alternatively, the terminals 27 may be connected to an "area system" according to the block diagram of Figure 1.

In either case, since the three primary windings are in series, the current in the primaries is the same in all the LVT's.

The function of bourdon tube 19 and its associated LVT 24 in this arrangement is to compensate for errors introduced into the system by response of bourdon tubes 5 and 12 to forces or conditions other than those which each is specifically intended to measure. Bourdon tube 19 is also responsive to such spurious forces or conditions and produces an output signal which is proportional to the algebraic sum of such forces or conditions. Its output is applied together with the outputs of LVT's 9 and 16 to a combining means taking the form of a circuit diagrammatically indicated at 28 in Figure 2.

In this circuit, the output signals appearing across the terminals of secondaries of LVT's 9 and 16 are combined with weights respectively of $a_1$ and $a_n$ in the noation of Equation 1, and the output of LVT secondary winding 26 is accorded a combining weight of $-(a_1+a_n)$. Still more generally, in the combining means of the invention, the outputs of the primary force or condition sensitive devices respectively representing forces or conditions $P_1, \ldots P_n$ are weighted respectively in the proportions $a_1, \ldots a_n$ and the output of the single reference device (in this case bourdon tube 19 and LVT 24) is weighted in accordance with the co-efficient $-(a_1+a_n)$. The combined signal in circuit 28 therefore is described by the equation:

$$F = Q[a_1(P+X) + \ldots a_n(P_n+X) - (a_1+ \ldots a_n)X] \quad (4)$$

It will be seen upon inspection that Equation 4 is the equivalent of Equation 1, i. e., that the output of the single reference device is of a form to precisely balance out all of the terms in X, whose presence in Equation 2 above is attributable to the response of the primary sensitive devices to X.

Similarly, in the notation of Equation 3 the combining circuit 28 of Figure 2 accords to the outputs of LVT secondary windings 11 and 18 respectively, combining weights of 1 and $-C_1$, their co-efficients in Equation 3, and accords to the output of secondary winding 26 a combining weight of $-(1-C_1)$ which is the negative of the sum of the co-efficients of $P_{t_6}$ and $P_{am}$. In the notation of Equation 3 the signal in output circuit 28 of Figure 2 will be:

$$F = KA_7[1(P_{t_6}+X) - C_1(P_{am}+X) - (1-C_1)X] \quad (5)$$

which is the equivalent of Equation 3.

Figure 3:
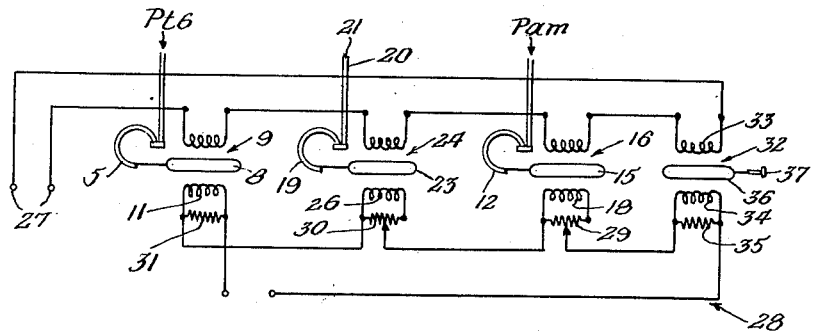
Figure 3 is a schematic diagram of a pressure measuring and computing apparatus in accordance with the invention, and incorporating means for adjusting the apparatus and also incorporating novel means for according to each signal component its respective combining weight.

In Figure 3 I have illustrated certain additions and further detail to the illustration of Figure 2. First note that secondary windings 11, 18 and 26 are shunted respectively by resistances 31, 29 and 30. Resistances 29 and 30 are adjustable voltage dividers while resistance 31 is a fixed resistance; but the total resistance of each of the three resistances is the same, so that the loads presented to the three LVT's are identical. The movable contact of resistance 29 is adjusted so that the portion of the resistance which is included in the output circuit has a ratio to the total resistance of resistor 29 equal to $C_1$:1, thus establishing the combining weight of the output voltage of winding 18 with respect to that of the output voltage of winding 11. Similarly, the adjustable contact of voltage divider 30 is adjusted so that the portion of its resistance which is included in the output circuit bears a ratio to the total resistance of voltage divider 30 equal to $(1-C_1)$:1. The outputs of windings 18 and 26, thus weighted, are combined with that of winding 11 in phase opposition so that, having regard to the negative sign of $C_1$ in the thrustmeter Equation 3, the combining weight afforded the output of reference LVT 24 is equal to the negative of the sum of the combining weights afforded the outputs of LVT's 9 and 16.

The circuit of Figure 3 also includes a fourth LVT generally indicated at 32 and having a primary winding 33 and a secondary winding 34 which are respectively connected into the primary and secondary circuits already described, the secondary 34 being shunted by a resistor 35 whose value is equal to the values of the resistors 29, 30 and 31. LVT 32 is provided with a core 36 and means for adjusting the position of the core comprising a screw 37. Adjustable LVT 32 is provided so that steady state or bias currents results from imperfect balancing of the other three LVT's may be cancelled out. While it is possible to eliminate the bias currents by extremely careful adjustment of the bourdon tube LVT's, such adjustment is fairly critical and it is preferable to add an adjustable LVT so that the bias current can be eliminated in a single adjustment.

Figure 4:
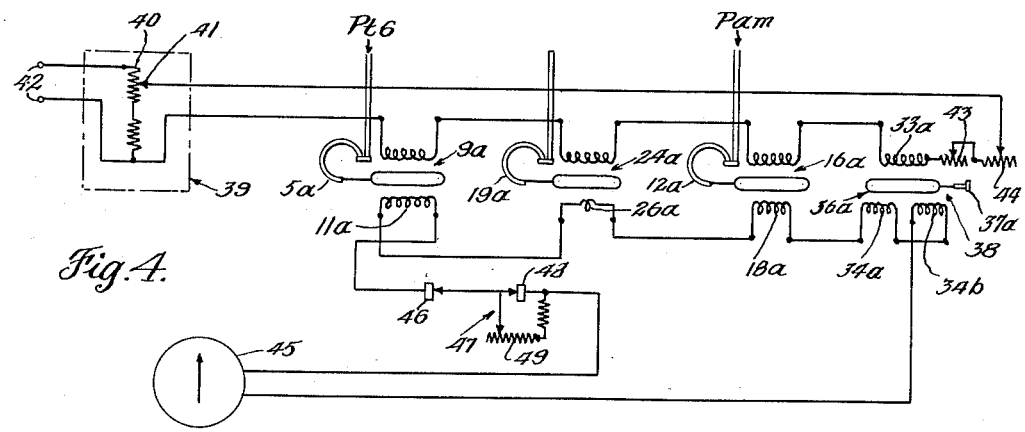
Figure 4 is a schematic diagram of a complete embodiment of a thrust measuring and computing apparatus incorporating adjusting and weighting means different from those illustrated in Figure 3.

Figure 4 illustrates yet further modifications of the invention as already discussed. Note first that in the arrangement of Figure 4 the secondary windings 11a, 18a and 26a of LVT's 9a, 16a and 24a respectively have an unequal number of turns. In the illustration shown, secondary winding 11a has five turns; secondary winding 18a has four turns; and secondary winding 26a has one turn. Since the output voltages of the LVT's are proportional to their turns ratios, it will be seen that, according to this arrangement, the output voltages of LVT's 9a, 16a and 24a are given combining weights respectively of plus 5, minus 4; and minus 1, corresponding to a thrustmeter in which the co-efficient $C_1$ is $-.8$.

This arrangement is thus equivalent to the voltage divider arrangement of Figure 3. It has the advantage, however, as compared with the arrangement of Figure 3, that none of the power output of the LVT's is dissipated in the resistances and all is therefore available to drive a meter or other load device. Where an amplifier is not employed, i. e., where a meter is to be directly driven, as in the arrangement of Figure 4, it may be desirable to obtain a relatively high power output; and in that circumstance, the arrangement of Figure 4 is preferable to that of Figure 3. On the other hand, control of effective turns ratio of an LVT is relatively difficult and is not capable of simple re-adjustment once the apparatus is built. The arrangement of Figure 3 is therefore preferable from a manufacturing standpoint, especially when a low power output is acceptable; and is advantageous when it is contempltaed that the weighting factors should be adjustable to adapt the apparatus to the solution of an equation having co-efficients different from those originally contemplated.

Turning again to Figure 4, it should be noted that the adjustable LVT 38 is provided with a split secondary having windings 34a and 34b connected in series opposition. This variety of LVT is known as a linear variable differential transformer, or LVDT, and has the advantage over LVT 32 of Figure 3 that it may be employed to compensate for biasing voltages of either polarity, since the phase of its output voltage shifts from one polarity to the other when the core 36a passes the null point, i. e., the point at which the flux linkages between the primary windings 33a and the respective secondary windings 34a and 34b are equal.

The arrangement of Figure 4 is the circuit of a complete thrustmeter whose physical structure is illustrated in Figures 5 to 9 inclusive. The thrustmeter of Figure 4 includes an area system generally indicated at 39 and comprising a voltage divider 40. The system of Figures 4 through 9 is adapted to use in an aircraft in which the tail area does not change, and accordingly the voltage divider 40, which is actuated by adjustable control 41, is set at the time of installation of the thrustmeter in the aircraft and does not require further adjustment.

The primary circuit of Figure 4 is adapted to be energized from an alternating current supply through input terminals 42.

The primary circuit of Figure 4 also includes a pair of variable resistors 43 and 44 which are used to vary scale factor K when calibrating the instrument. Variable resistor 43 is provided with a control operable from the outside of the instrument case, which is adapted to be adjusted for field calibration of the instrument to compensate for variations in K peculiar to the specific installation, while variable resistor 44 is adapted to be adjusted at the factory, so that, despite the individual characteristics of the instrument in question, variable resistor 43 will be at mid-scale when installed in a typical aircraft.

The output circuit of Figure 4 is connected to an indicating device 45 which may take the form of a direct current meter calibrated directly in thrust. The output circuit also includes a rectifier 46 and a temperature compensating circuit generally indicated at 47 and including a semi-conductor device 48 and a variable resistor 49. The resistance of semi-conductor device 48 has a negative co-efficient of resistance with respect to temperature, while the net co-efficient of resistance with respect to temperature of the rest of the apparatus is positive. Resistor 49 is adjusted during manufacture to introduce into the circuit sufficient of the resistance of the semi-conductor device 48 to compensate for the positive temperature co-efficient of the rest of the apparatus.

The semi-conductor 48, used in the embodiment of Figure 4 is a selenium rectifier, which has a large negative co-efficient of back resistance with respect to temperature. Rectifier 48 is connected back-to-back, i. e., with opposite polarity, to rectifier 46, and is of a different type from rectifier 46, which is selected for good rectification efficiency. The amount of the forward resistance of rectifier 48 is of no importance in this circuit, since the high back resistance of rectifier 46 prevents any appreciable current from flowing in the circuit during the reverse half of each cycle of the alternating voltage. On the other hand, the shunt resistance consisting of the back resistance of rectifier 48 and variable resistance 49 is relatively low and does not greatly reduce the current flowing in the circuit during the conducting half of each cycle. Devices other than rectifiers, but having negative co-efficients of resistance with respect to temperature, may of course be used for this purpose.

As will be seen from Figures 5 and 6, the pressure system of the apparatus of Figures 4 to 9 is enclosed in a case 50 secured as by mountings 51 and bolts 52 to a portion 53 of the aircraft. Each of the bourdon tubes is supported at its fixed end 54 by a mounting block 55 which in turn is supported by an LVT housing 56. The free ends of bourdon tubes 5a, 12a and 19a respectively are connected by means of links 7a, 14a and 22a to cores 8a, 15a and 23a of LVT's 9a, 16a and 24a. Also to be seen in Figure 5 adjustable LVDT 38 with its adjustable core 36a. Field calibration variable resistance 43 is provided with an externally accessible knob 57 and a cooperating pointer 58. Factory calibration resistor 44 is provided with an adjusting nut 59; and temperature calibration resistor 49 is provided with a calibration nut 60.

It will be understood that the orientation of the three bourdon tubes and the three associated LVT's is the same. As a consequence, although each bourdon tube is individually responsive to acceleration, so that each LVT will produce an output voltage which is a function of acceleration, the output signal will not be affected by acceleration because the algebraic sum of the acceleration components in the combining circuit will be zero.

It should also be mentioned that the walls of the case 50 are desirably made of aluminum or other material of high thermal conductivity, in order to prevent the establishment of large temperature gradients in the apparatus, so that the three bourdon tubes and their associated LVT's are subjected to about the same temperatures. So long as the three transducer devices have the same temperatures, any individual response due to expansion or contraction will be eliminated from the output of the computer, because the algebraic sum of the responses to temperature will be zero, as pointed out above.

Finally, in connection with the pressure system illustrated in Figures 5 and 6, it should be pointed out that fittings 61 and 62 are provided to connect tubes 6 and 13 respectively to lines leading to the pressure probe and altimeter line respectively, and electric connectors 63 and 64 are provided to connect the pressure system to lines leading to the area system and indicating device respectively illustrated in Figures 7 and 9.

The area system comprises a casing 65 secured by means of mounting 66 and bolts 67 to a portion 68 of the aircraft structure. Casing 65 encloses voltage dividing potentiometer 40, which is provided with a control knob 69 carrying a scale 70 and a cooperating pointer 71. A pair of electric connectors 72 and 73 provide for connection of the area box to the computer and to a power supply.

The pressure system and area box may be located in any convenient portion of the aircraft, but meter 45, which is illustrated in Figure 9, is desirably mounted in the aircraft instrument panel 74 by means of bolts 75. Meter 45 is provided with an electric connector 76 to provide for connection of the meter to the pressure system.

In contrast with the embodiments of the invention so far described, the remaining forms illustrated herein employ mechanical means for performing the weighting and combining functions accomplished electrically in the apparatus of Figures 1 through 9.

Thus, in Figure 10 I have illustrated a supporting member 77 on which are mounted bellows devices 78, 79 and 80. Bellows 78 is adapted to be connected by a line 81 to a source of $P_{t_6}$; bellows device 79 is adapted to be connected by a line 82 to a source of $P_{am}$; and bellows device 80 is evacuated and sealed.

Bellows devices 78, 79 and 80 are connected by links 83, 85 and 84 respectively to a beam or lever 86 which is supported for oscillatory movement on a pivot diagrammatically indicated at 87. Links 83, 84 and 85 are connected to beam 86 by means of pivot connections 88, 89 and 90 whose positions of attachment to the beam are spaced from pivot 87 by distances corresponding to the combining weights to be afforded the outputs of the respective devices.

Thus, the distance between pivot 87 and connection 90 is about four-fifths of the distance between pivot 87 and connection 88; and connection 89 is positioned a distance from pivot 87 about one-fifth of the distance between pivot 87 and connection 88.

Bellows device 78 is responsive to the difference between its internal pressure, which is $P_{t_6}$ absolute, and its external pressure, which is $P_a$ absolute, to produce a force proportional to $P_{t_6}$ gauge tending to oscillate beam 86 about pivot 87, while bellows device 79 is responsive to the difference between $P_{am}$ absolute and $P_a$ absolute to apply a force to beam 86 tending to oscillate it in a direction contrary to that occasioned by bellows 78. And, as before, the combining weight afforded the force developed by bellows 80, which is the reference device, is the negative of the sum of the combining weights afforded the force developed by bellows 78 and 79. As a consequence, the instantaneous oscillatory position of beam 86 will be determined solely by $P_{t_6}$ and $P_{am}$ absolute and will be unaffected by $P_a$ or other spurious forces.

The apparatus of Figure 10 includes an LVDT 91 whose core 92 is coupled to beam 86 by a link 93. LVDT 91 may be incorporated in an electric indicating circuit such as that illustrated in Figure 13. For present purposes, it is enough to point out that, as in the case of the other LVT's discussed herein the output voltage of LVDT 91 is proportional to the position of its core 92, which position in turn is determined by the forces applied to beam 86 by bellows devices 78, 79 and 80.

In order to compensate for any asymetry of the beam and the presence of the LVT core, I have included in the structure of Figure 10 a counter weight 94, which is secured to one end of beam 86 and which carries within it a screw 95 whose position can be adjusted to provide a vernier adjustment of the balance of beam 86 and other moving parts of the system.

The output of apparatus such as that illustrated in Figure 10 may be indicated or utilized in a variety of ways. For example, in Figure 11 I have illustrated schematically a means for coupling the beam 86 to an indicating pointer 96 by means of a pinion 97 mounted on the pointer shaft 98. The teeth of pinion 97 mesh with the teeth of a gear sector 99 secured to the end of beam 86. The calibration of the scale 100 with which pointer 96 cooperates and the dimensions of the linkage interconnecting the pointer and beam 86 are proportioned to give effect to scale factor K and tail area $A_T$ of Equation 2. Thus, according to the embodiment illustrated in Figures 10 and 11, I provide a thrustmeter which is entirely mechanical in its operation and which may be constructed in an extremely compact and rugged form.

Alternatively, the mechanical combining means may be employed in an electrical system in which LVT 91 of Figure 10 is incorporated in na electrical circuit such as that illustrated in Figure 13.

Figure 13 is a schematic diagram of a complete thrustmeter incorporating the mechanical combining means of Figure 10 and including an indicating circuit and a variable area box adapted to be actuated by the mechanism which controls the area of the engine exhaust nozzle exit.

In Figure 13 there is indicated generally at 101 an area box comprising a voltage dividing potentiometer 102, which is adapted to adjust the amplitude of a voltage derived from input terminals 103 in accordance with an empirically derived relationship (reflected in the illustrated internal circuit of voltage divider 102) to movement of the aircraft nozzle exit area actuator. Voltage divider 102 is provided with a control member 104, which, as is illustrated in Figure 12, is adapted to be actuated by the mechanism which adjusts the area of the nozzle exit. Thus, in Figure 12 there is illustrated a servo motor 105 adapted to control the area of the nozzle exit through linkage 106, 107 and 108. This same linkage is cross-connected by means of members 109 and 110 to control member 104 of area box 101. Accordingly, member 104 is driven concurrently with the tail area actuator by servo motor 105.

The circuit of Figure 13 also includes a pair of variable resistors 111 and 112 which are respectively the field and factory K factor calibration controls, as discussed in connection with Figure 4.

LVDT 91 is of the differential type, that is, its secondary comprises a pair of opposed windings 113 and 114; and the output voltage developed by LVDT 91 is applied to a direct current meter 115 through a rectifier 116 and a temperature compensating circuit comprising a thermistor 117 and a variable resistance 118.

The physical construction of the computer portion of the thrustmeter illustrated in Figure 13 is shown in Figures 14 through 17. The computer of these figures is enclosed in a liquid-tight housing 119 provided with a cover 120 and sealed with a membrane 121.

Instrument case 119 is adapted to be filled through opening 152a with a damping fluid, for example, a silicone damping fluid having a viscosity grade of 20 centistokes. The liquid assists in damping out vibrations which might otherwise damage portions of the computer, or cause erroneous thrust indications, and performs the additional function of providing uniform temperature conditions throughout the instrument so that all of the bourdon tubes operate under about the same temperature conditions. Volumetric changes in the liquid due to temperature changes are accommodated by membrane 121. The cover 120 serves to protect membrane 121, but the space between membrane 121 and cover 120 is in communication with the atmosphere surrounding the instrument, such communication being provided by the hole 162 in cover 120 so that the liquid, and hence the bourdon tubes are always exposed to the ambient pressure in the aircraft.

The heart of the computer is beam 122, secured for oscillatory movement by a flexible pivoting mount generally indicated at 123 which is secured to a mounting plate 124 which in turn is fastened to case 119 by screws 125. The pivotal mount comprises a block 126 to which are secured the upper portions of bifurcated spring members 127, 128 (see Figures 14 and 16). Another block member 129 is secured to beam 122, and the lower portions of spring members 127, 128 are secured to block 129. The spring members 127 are held against block 126 by a clamp plate 130 which extends the full length of block 126. The lower ends of member 127 are secured to block 129 by individual clamps 131, one of which may be seen in Figure 14. Spring members 128, which are located between members 127, are secured to block 126 by a clamp plate 132 and to lower block 129 by individual clamps 133, one of which can be seen in Figure 14 and both of which are visible in Figure 16. This arrangement provides a practically frictionless pivot for beam 122.

Bourdon tubes 134, 135 and 136 are also mounted on mounting plate 124, the fixed ends of the three tubes being respectively secured to blocks 137, 138 and 139. Bourdon tube 134 is adapted to be connected to a source of $P_{am}$ by a connecting tube 140 and a fitting 141. Bourdon tube 135 is similarly adapted to be connected to a source of $P_{t_6}$ by a tube 142 and fitting 143. Bourdon tube 136 is evacuated and sealed so that it measures the ambient pressure in its own environment in absolute terms.

The free ends of the bourdon tubes are connected to the beam by means of links 144, 145 and 146, which links in turn are secured to the beam by means of screws 147, each of which passes through a slot in the foot of its link and thence into a tapped hole 148 in beam 122. It will be noted that a plurality of holes 148 are provided and it should be pointed out that the slots in links 144, 145 and 146 are sufficiently long to overlap two adjacent holes 148. As a result it is possible to vary the position of attachment of the links 144, 145 and 146 to the beam continuously within a range determined by the number and spacing of the holes 148.

In general, the location of the points of attachment is such as to provide for imposition of torque moments on beam 122 by the bourdon tubes which are proportional to the pressures measured by the respective tubes and the co-efficients of those pressures in the thrust equation.

Thus, the force developed by bourdon tube 134 is proportional to the difference between its internal pressure $P_{am}$ and the ambient pressure in the apparatus. Similarly, bourdon tube 135 applies a force to beam 122 which is proportional to $P_{t_6}$ gauge; and the holes in the left end of the beam are spaced from the pivot by a distance such that the force developed by bourdon tube 134 may be applied at a distance from the pivot which is $C_1$ times the distance separating the point of attachment of bourdon tube 135 from the pivot. And, the free end of bourdon tube 136 is connected to the beam at a position such that it imposes a torque moment on the beam in its response to the local ambient pressure which is the negative of the algebraic sum of the torques imposed by tubes 134 and 135 in response to the same pressure.

Furthermore, the provision of a plurality of holes 148 and of the slots in the feet of the connecting members 144, 145 and 146 provides for the adjustment of the apparatus to solve equations in which the value of the co-efficient $C_1$ varies from that originally contemplated.

Beam 122 also carries a counter-weight 149 whose weight and position are selected to bring the entire oscillatory system into general balance. Fine adjustment is provided by means of a screw 150 threaded into a tapped hole 151 in counter-weight 149. The position of screw 150 in counter-weight 149 is adjusted by removing filler plug 152 and inserting a screw driver through the opening 152a.

At its opposite extremity, beam 122 is connected to and carries core 153 of LVDT 154. LVDT 154 is enclosed in a housing 155 carrying a stud 156 which is adapted to extend through a slot 157 in back cover 158 of case 119. An annular groove 159 is cut into the inner surface of back cover 158 and an O ring 160 in groove 159 provides a seal for slot 157.

This arrangement provides for shifting the position of LVDT 154 relative to core 153 for elimination of any steady state or bias voltage. This is accomplished by loosening nut 161 slightly and adjusting the position of the LVDT for the desired output and then retightening the nut.

Case 119 includes a compartment 163, separated from the damping fluid-filled computer compartment, in which may be seen field calibration control 111, factory calibration control 112, rectifier 116 and temperature compensation control 118. As was explained in connection with Figure 13, control 111 is adapted to be adjusted in the field to calibrate the instrument for the particular installation, and to that end is provided with a control shaft having a slotted head 164 which is adapted to be engaged by a key 165 on the shaft 166 of a control knob 167. The remaining controls, i. e., factory calibration control 112 and temperature compensation control 118 are resistors of the fixed-variable type and cannot be adjusted without opening the case of the instrument.

The instrument of Figures 14 to 17 is also provided with electric connectors 168 providing for interconnection of the apparatus with the area box and meter, and with a fuse receptacle 169.

I claim:

1. Apparatus comprising a plurality of devices each respectively responsive to a different variable condition and all responsive to another variable condition, each of said devices producing a signal proportional to its respective condition and to said other condition, a single device identical with each of said plurality of devices in its response to said other variable condition, and producing a signal proportional to said other condition, means for adjusting the magnitudes of each of the signals produced by said plurality of devices in proportion to a respective combining weight, and for adjusting the magnitude of the signal produced by said single device in proportion to a combining weight equal to the negative of the sum of the respective combining weights by which the signals produced by said plurality of devices are adjusted, and means for algebraically adding all of said adjusted signals.

2. A thrust computer for a reaction motor, comprising a first signal-producing pressure sensitive device responsive to variations in exhaust-nozzle inlet pressure and to another variable condition; a second signal-producing pressure sensitive device responsive to variations in ambient atmospheric pressure and to said other variable condition; a third signal-producing device identical with said first and second devices in its response to said other variable condition; means for adjusting the magnitudes of the signals produced by said first and second devices in proportion to respective combining weights having a ratio to one another of 1 to $-C$, where C is a constant, and for adjusting the magnitude of the signal produced by said third device in proportion to a combining weight equal to the negative of the sum of the respective combining weights by which the signals produced by said first and second devices are adjusted, and means for additively combining said three adjusted signals.

3. Apparatus comprising a plurality of devices, each respectively responsive to a different variable condition and all responsive to another variable condition, each of said devices producing an electric signal linearly related to the algebraic sum of the instantaneous values of the conditions to which it is responsive, another device responsive to said other condition to produce an electric signal linearly related to the instantaneous value of said other condition, means for adjusting the magnitudes of the signals from respective ones of said plurality of devices in proportion to respective combining weights, and for adjusting the magnitude of the signal from said other device in proportion to a combinnig weight equal to the negative of the sum of said respective combining weights, and a circuit for additively combining the adjusted signals from all of said devices.

4. Apparatus in accordance with claim 3 in which said means comprises circuit elements respectively associated with said devices and in which the respective values of a circuit constant of said respective elements are proportional to said combining weights.

5. Apparatus in accordance with claim 4 in which said circuit elements comprise linear variable transformers respectively forming parts of said devices and in which said circuit constant is the mutual inductance between the windings of said transformers.

6. Apparatus in accordance with claim 4 in which said circuit elements comprise voltage dividers respectively connected to the outputs of said devices and in which said circuit constant is the resistance of the portions of said voltage dividers included in said combining circuit.

7. Apparatus for producing a signal output whose value is a function of F, where $F=Q[a_1P_1+ \ldots a_nP_n]$ wherein the variables $P_1, \ldots P_n$ represent $n$ variable forces to be measured, Q is a factor of proportionality, and $a_1, \ldots a_n$ are respectively the co-efficients of $P_1, \ldots P_n$, in an environment such that the apparatus is subjected to a variable force X, which apparatus comprises $n$ force measuring devices for measuring forces $P_1, \ldots P_n$, each producing a signal output which is a function of a different one of said $n$ forces and also each producing a signal output which is a function of X, another force sensitive device whose signal output is a function of X, means for producing and applying to the respective signal outputs of said $n$ devices combining weights determined by said respective co-efficients, means for producing and applying to the signal output of said other device a combining weight determined by the co-efficient $-(a_1+ \ldots a_n)$, and means for algebraically adding said signal outputs.

8. Apparatus for producing a signal output whose value is a function of F, where $$F=Q[a_1P_1+ \ldots a_n]$$

wherein the variable $P_1, \ldots P_n$ represent $n$ forces, Q is a factor of proportionality and $a_1, \ldots a_n$ are respectively the co-efficients of $P_1, \ldots P_n$, under conditions such that the apparatus is subjected to a variable acceleration E, which apparatus comprises $n$ force-sensitive devices, each producing a signal output which is a function of a different one of said $n$ forces and each of which also produces a signal output which is a function of E, another force sensitive device whose signal output is a function of E, all of said devices being mounted in the same sense so as to be similarly affected by the acceleration E, means for producing and applying to the respective signal outputs of said $n$ devices combining weights determined by said respective co-efficients, means for producing and applying to the signal output of said other device a combining weight determined by the co-efficient $$-(a_1+ \ldots a_n)$$

and means for algebraically adding said signal outputs.

9. Apparatus for producing a signal output whose value is a function of F, where $F=Q[a_1P_1+ \ldots a_nP_n]$, wherein the variables $P_1, \ldots P_n$ represent $n$ pressures, Q is a factor of proportionality, and $a_1, \ldots a_n$ are respectively the co-efficients of $P_1, \ldots P_n$, under conditions such that the apparatus is surrounded by a fluid medium whose pressure is $P_a$, which apparatus comprises $n$ pressure sensitive devices, each producing a signal output which is a function of a different one of said $n$ pressures referred to $P_a$, another pressure sensitive device whose signal output is a function of $P_a$ referred to vacuum, means for producing and applying to the respective signal outputs of said $n$ pressure sensitive devices combining weights determined by said respective co-efficients, and means for producing and applying to the signal output of said other pressure sensitive device a combining weight determined by the co-efficient $-(a_1+ \ldots a_n)$, and means for additively combining said signal outputs.

10. Apparatus in accordance with claim 9 in which each of said pressure sensitive devices comprises a movable member and in which the signal output of each pressure sensitive device is applied to said combining means as a force whose amplitude varies linearly with a respective one of said pressures.

11. Apparatus in accordance with claim 10 in which said combining means comprises a movable combining member mounted for oscillation about a center and in which the outputs of said devices are applied to said combining member by interconnections between the respective movable members of the devices and said combining member, which interconnections are made to said combining member at points whose distances from said center are functions respectively of the co-efficients of $P_1, \ldots P_n$, and $P_a$.

12. Apparatus in accordance with claim 9 in which each of said pressure sensitive devices produces an electrical output signal and in which said combining means is an electrical circuit.

13. Apparatus in accordance with claim 12 in which the means for applying the respective output signals of said pressure sensitive devices to said combining circuit comprises circuit elements associated respectively with the devices, and in which electrical constants of the respective circuit elements have values corresponding to the respective combining weights of $P_1, \ldots P_n$, and $P_a$.

14. A thrustmeter comprising a plurality of pressure electric transducers, each transducer comprising a pressure sensitive device having a movable output element and a linear variable transformer having a core coupled to said movable element for movement therewith, each of said devices being connected to a source of a pressure to be measured, each said transducer producing an electric signal which varies linearly with the pressure of the source to which its device is connected and with the ambient pressure in the apparatus; another transducer comprising a similar pressure sensitive device and linear variable transformer, the pressure sensitive device of said other transducer being arranged to produce an electric signal which varies linearly with ambient atmospheric pressure in the apparatus, and an output circuit to which the output windings of all of said transformers are connected in series, each of the transformers of said plurality of transducers being constructed with a turns ratio selected to apply its output to said circuit with a predetermined combining weight, and the transformer of said other transducer being constructed with a turns ratio selected to apply its output signal to said circuit with a combining weight equal to the negative of the sum of the combining weights with which the outputs of said plurality of said transformers are applied to said circuit.

15. Apparatus in accordance with claim 14 in which said pressure sensitive devices are bourdon tubes.

16. Apparatus comprising a plurality of devices for translating pressure into mechanical force, each of said devices being responsive to a different pressure to be measured and all being responsive to a spurious pressure, so that the force developed by each varies linearly with the algebraic sum of its respective pressure to be measured and said spurious pressure, mechanical combining means comprising a member movable about a center, means for applying the forces developed by said respective devices to said member at different respective distances from said center, to produce a plurality of torques around said center, another device similar to said plurality of devices in response to said spurious pressure, and developing a force which varies linearly therewith, and means for applying the force developed by said other device to said member at a distance from said center equal to the negative of the algebraic sum of said different respective distances, and means for indicating the amount of movement of said member.

17. Apparatus in accordance with claim 16 in which said last mentioned means comprises a mechano-electric transducer driven by said member, an electric indicating device, and a circuit interconnecting said transducer and said device.

18. Apparatus in accordance with claim 16 in which said last mentioned means comprises a mechanical indicator and linkage drivingly interconnecting said indicator and said member.

19. A thrust computer comprising a member mounted for movement about a center; a first bourdon tube connected to a source of engine exhaust nozzle inlet pressure and coupled to said member at a predetermined distance from said center; a second bourdon tube connected to a source of ambient pressure outside the aircraft and coupled to said member at a second distance from said center related to said first distance in the ratio $C_1:1$, where $C_1$ is a constant, the connections of said two bourdon tubes to said member being such as to cause movement thereof in opposite directions upon increase of pressure in the two tubes in the same sense; a third bourdon tube evacuated and sealed and coupled to said member at a distance from said center equal to the difference between said first two distances and in a sense to cause movement of said member in a direction opposite to the movement caused by said second bourdon tube when the ambient pressure on the outside of all of said bourdon tubes is increased, and means for indicating the amount of movement of said member.

20. Apparatus in accordance with claim 19 in which said means comprises a linear variable differential transformer having a core coupled to said member, and further including an electric meter for indicating the output voltage of said transformer.

21. Apparatus in accordance with claim 1 and further including a liquid-tight housing surrounding said devices, and a body of liquid therein.

22. Apparatus in accordance with claim 21 and further including means for accommodating changes in the volume of said liquid due to temperature variations, and means for maintaining said liquid at the pressure of the atmosphere surrounding said housing.

References Cited in the file of this patent

UNITED STATES PATENTS

| | | |
|---|---|---|
| 2,524,749 | Baldridge | Oct. 10, 1950 |
| 2,540,807 | Berry | Feb. 6, 1951 |
| 2,579,617 | Schaevitz | Dec. 25, 1951 |
| 2,593,169 | Moore | Apr. 15, 1952 |
| 2,680,373 | Bechberger | June 8, 1954 |

UNITED STATES PATENT OFFICE

Certificate of Correction

December 30, 1958

Patent No. 2,866,332

Samuel M. Sherman

It is hereby certified that error appears in the printed specification of the above numbered patent requiring correction and that the said Letters Patent should read as corrected below.

Column 2, line 45, for "forcess" read —forces—; column 4, lines 62 and 63, "for "noattion" read —notation—; line 74, for "$(P+X)+$" read —$(P_1+X)+$—; column 5, line 53, for "results" read —resulting—; column 6, line 15, for "contempltaed" read —contemplated—; column 7, line 21, before "adjustable" insert —is—; column 8, line 1, for "$Pt_6$" read —$P_{t_6}$—; line 66, for "na" read —an—; column 10, line 17, before "imposition" insert —the—; column 11, line 54, for "combinnig" read —combining—; column 12, line 20, for "$F=Q[a_1P_1+ \ldots a_n]$" read —$F=Q[a_1P_1+ \ldots a_nP_n]$—.

Signed and sealed this 2nd day of June 1959.

[SEAL]

Attest:
KARL H. AXLINE,
Attesting Officer.

ROBERT C. WATSON,
Commissioner of Patents.